United States Patent
Cleveland

(10) Patent No.: US 6,917,645 B2
(45) Date of Patent: Jul. 12, 2005

(54) APPARATUS AND METHOD FOR DETECTING PILOT CHANNEL SIGNALS WITH LOW SIGNAL-TO-NOISE

(75) Inventor: Joseph Robert Cleveland, Richardson, TX (US)

(73) Assignee: Samsung Electronics Co., Ltd., Suwon (KR)

(*) Notice: Subject to any disclaimer, the term of this patent is extended or adjusted under 35 U.S.C. 154(b) by 622 days.

(21) Appl. No.: 10/024,092

(22) Filed: Dec. 14, 2001

(65) Prior Publication Data

US 2003/0112857 A1 Jun. 19, 2003

(51) Int. Cl.$^7$ .................................................. H04B 1/69
(52) U.S. Cl. ........................ 375/152; 375/140; 375/147; 375/149
(58) Field of Search ................................. 375/148, 149, 375/152

(56) References Cited

U.S. PATENT DOCUMENTS 6,141,374 A * 10/2000 Burns .......................... 375/152
6,515,980 B1 * 2/2003 Bottomley ................... 370/342
2003/0067898 A1 * 4/2003 Challa et al. ................ 370/335

* cited by examiner

Primary Examiner—Stephen Chin
Assistant Examiner—Erin M. File

(57) ABSTRACT

A CDMA receiver for detecting a pilot channel signal having a known pseudo-random noise (PN) chip sequence, the known PN chip sequence comprising a plurality of known Logic 1 chips and a plurality of known Logic 0 chips. The CDMA receiver comprises: 1) a memory for storing the pilot channel signal as a first original sequence of chip samples; 2) a pseudo-signal generator for re-ordering selected ones of the first original sequence of chip samples to thereby generate a first re-ordered sequence of chip samples, wherein the pseudo-signal generator combines the original sequence of chip samples with the first re-ordered sequence of chip samples to thereby generate a first pseudo-signal sequence of combined chip samples; 3) a first matched filter for computing a first correlation value indicating a relative correlation between the first pseudo-signal sequence of combined chip samples and the known PN chip sequence; and 4) a decision circuit for determining from the first correlation value if the pilot channel signal has been detected.

20 Claims, 5 Drawing Sheets

APPARATUS AND METHOD FOR DETECTING PILOT CHANNEL SIGNALS WITH LOW SIGNAL-TO-NOISE

TECHNICAL FIELD OF THE INVENTION

The present invention is directed, in general, to wireless communications devices and, more specifically, to mobile station or other access terminal using an RF receiver capable of detecting pilot channel signals having a low signal-to-noise ratio.

BACKGROUND OF THE INVENTION

Wireless communication systems, including cellular phones, paging devices personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCs systems, and wireless modems, has been driven down to the point where these devices are affordable to nearly everyone and the price of a wireless device is only a small part of the end-user's total cost. To continue to attract new customers, wireless service providers concentrate on reducing infrastructure costs and operating costs, and on increasing handset battery lifetime, while improving quality of service and increasing capacity in order to make wireless services cheaper and better.

To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

CDMA technology is used in wireless computer networks, paging (or wireless messaging) systems, and cellular telephony. In a CDMA system, mobile stations and other access terminals (e.g., pagers, cell phones, laptop PCs with wireless modems) and base stations transmit and receive data on the same frequency in assigned channels that correspond to specific unique orthogonal codes. For example, a mobile station may receive forward channel data signals from a base station that are encoded, formatted, interleaved, spread with a Walsh code and a long pseudo-noise (PN) sequence. In another example, a base station may receive reverse channel data signals from the mobile station that are framed, repeated, encoded, block interleaved, modulated by a 64-ary orthogonal modulation, and spread prior to transmission by the mobile station. In another embodiment, a base station may receive reverse channel data signals from the mobile station that are framed, repeated, encoded, block interleaved, spread prior to transmission by the mobile station. Those skilled in the art will recognize that mobile station may employ quadrature phase shift keying (QPSK) modulation, binary phase shift keying (BPSK) modulation, quadrature amplitude modulation (QAM) or other digital modulation format for modulation of an RF carrier for transmission of the data signals. One such implementation is found in the T1A IS-95 CDMA standard. Another implementation is the TIA IS-2000 standard.

It is preferable to implement wireless CDMA cellular or PCS systems that take full advantage of the performance improvements offered by adaptive antenna technologies. These improvements include increased range or cell size, reduced interference, and greater cell capacity. However, a constraint on system performance with adaptive antenna techniques is the range limitation of the pilot channel, synchronization (sync) channel, and paging channel overhead signals, since uniform sector coverage is required for these signals. This coverage requirement excludes the use of directive antenna gain offered by narrow transmission beams of adaptive antennas. For transmission of the pilot channel, sync channel and paging channel signals, a limited range implies that a base station transceiver might not make full use of the capacity offered by adaptive antenna techniques, depending on the distribution of access terminals. Full range and capacity coverage may require the application of more power in the overhead channels, which results in less available power to support subscriber traffic.

Therefore, there is a need in the art for CDMA wireless devices that improve the detection of CDMA pilot channels signals in order to extend the effective range and coverage of the base station transmitter. In particular, there is a need for CDMA mobile stations and access terminals that are capable of detecting pilot channel signals having a low chip signal-to-noise ratio (Ec/Io). More particularly, there is a need for an improved detection method that reduces the power level required for the pilot channel, which allows the assignment of more power in the base station to traffic channels.

SUMMARY OF THE INVENTION

This invention provides a novel apparatus and method for improving the detection of CDMA pilot channel signals in the forward (downlink) from the base station to a mobile station or a fixed access terminal. The invention allows wireless CDMA cellular or PCS systems to take full advantage of the performance improvements offered by adaptive antenna technologies, including increased range or cell size, reduced interference, and greater cell capacity. The present invention allows a mobile station or access terminal to acquire the pilot channel signal with a lower pilot channel signal transmit power level at the base station.

Those skilled in the art will recognize that operation with lower pilot channel transmit power reduces interference from pilot pollution in adjacent cells and results in greater wireless network capacity. The present invention allows the base station transceiver to operate at increased range and capacity within the effective isotropic radiated power (EIRP) defined by radio spectrum regulatory agencies, such as the US Federal Communications Commission (FCC).

To address the above-discussed deficiencies of the prior art, it is a primary object of the present invention to provide a CDMA receiver capable of detecting a pilot channel signal having a known pseudo-random noise (PN) chip sequence, the known PN chip sequence comprising a plurality of known Logic 1 chips and a plurality of known Logic 0 chips.

According to an advantageous embodiment of the present invention, the CDMA receiver comprises: 1) a memory capable of storing samples of the pilot channel signal as a first original sequence of chip samples; 2) a pseudo-signal generator capable of re-ordering selected ones of the first original sequence of chip samples to thereby generate a first re-ordered sequence of chip samples, wherein the pseudo-signal generator combines the original sequence of chip samples with the first re-ordered sequence of chip samples to thereby generate a first pseudo-signal sequence of combined chip samples; 3) a first matched filter capable of computing a first correlation value indicating a relative correlation between the first pseudo-signal sequence of combined chip samples and the known PN chip sequence; and 4) a decision circuit capable of determining from the first correlation value if the pilot channel signal has been detected.

According to one embodiment of the present invention, the pseudo-signal generator is further capable of re-ordering selected ones of the original sequence of chip samples to thereby generate a second re-ordered sequence of chip samples, wherein the pseudo signal generator combines the first pseudo-signal sequence of combined chip samples with the second re-ordered sequence of chip samples to thereby generate a second pseudo-signal sequence of combined chip samples.

According to another embodiment of the present invention, the first matched filter computes a second correlation value indicating a relative correlation between the second pseudo-signal sequence of combined chip samples and the known PN chip sequence.

According to still another embodiment of the present invention, the decision circuit determines from the second correlation value if the pilot channel signal has been detected.

According to yet another embodiment of the present invention, the pseudo-signal generator generates from the first original sequence of chip samples a first time-shifted original sequence of chip samples and re-orders selected ones of the first time-shifted original sequence of chip samples to thereby generate a first time-shifted re-ordered sequence of chip samples, wherein the pseudo-signal generator combines the first time-shifted original sequence of chip samples with the first time-shifted re-ordered sequence of chip samples to thereby generate a first time-shifted pseudo-signal sequence of combined chip samples.

According to a further embodiment of the present invention, the CDMA receiver further comprises a second matched filter capable of computing a second correlation value indicating a relative correlation between the first time-shifted pseudo-signal sequence of combined chip samples and the known PN chip sequence.

According to a still further embodiment of the present invention, the decision circuit determines from the second correlation value if the pilot channel signal has been detected.

According to a yet further embodiment of the present invention, the pseudo-signal generator re-orders the selected ones of the first original sequence of chip samples by 1) determining a first plurality of time slots, each of the first plurality of time slots comprising a plurality of chip samples corresponding to Logic 1 chips, and a second plurality of time slots, each of the second plurality of time slots comprising a plurality of chip samples corresponding to Logic 0 chips, and 2) at least one of: a) modifying an order of a first Logic 1 chip sample and a second Logic 1 chip sample; and b) modifying an order of a first Logic 0 chip sample and a second Logic 0 chip sample.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged radio frequency (RF) receiver.

Figure 1:
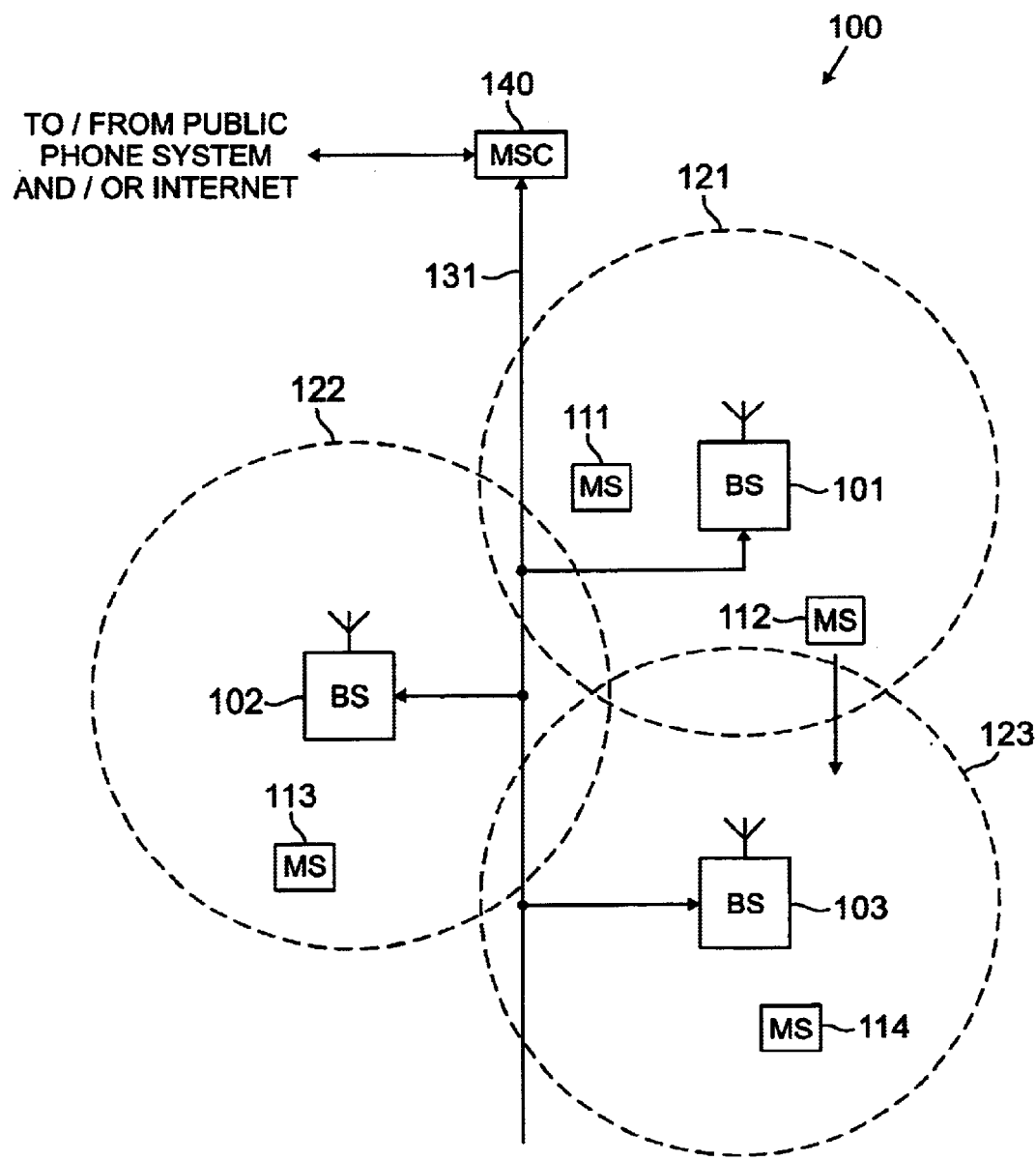
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 are operable to communicate with a plurality of mobile stations (MS) 111–114 over CDMA channels. Mobile stations 111–114 may be any suitable cellular devices, including conventional cellular telephones, PCS handset devices, portable computers, metering devices, and the like. Other types of access terminals, including fixed access terminals, also may be present in wireless network 100. However, for the sake of simplicity, only mobile stations are shown.

Dotted lines show the approximate boundaries of the cell sites 121–123 in which base stations 101–103 are located. The cell boundaries represent the minimum range defined by reliable reception of the pilot, synch and paging channels. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively. In one embodiment of the present invention, one or more base transceiver stations are equipped with adaptive antenna arrays.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a handoff will occur.

As is well known to those familiar with the art, the handoff procedure transfers control of a call from a first cell to a second cell. In one embodiment of the present invention, as MS 112 moves from cell 121 to cell 123, MS 112 detects the pilot signal from BS 103 and sends to BS 101 a Pilot Strength Measurement Message which reports the signal strength of the newly detected pilot signal. When the strength of the pilot transmitted by BS 103 and received and reported by MS 112 exceeds a threshold, BS 101 initiates a soft handoff process by signaling the target BS 103 that a handoff is required as described in TIA/EIA-95 or TIA/EIA-2000. BS 103 and MS 112 proceed to negotiate establishment of a communications link in the CDMA channel as described in TIA/EIA-95 or TIA/EIA-2000. Following establishment of the communications link between BS 103 and MS 112, MS 112 communicates with both BS 101 and BS 103 in a soft handoff mode. Those acquainted with the art will recognize that soft handoff improves the performance on both forward and reverse links. When the signal from BS 101 falls below a threshold, MS 112 may then drop the link with BS 101 and only receive signals from BS 103. MS 112 then transfers on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Wireless network 100 is a CDMA network in which, for example, MS 111 and BS 101 transmit and receive data in control channels and traffic channels using unique codes, such as 64-bit Walsh codes, for example. As will be explained below in greater detail, MS 111 is capable of capturing samples of a single copy of an incoming pilot channel signal and generating one or more new pseudo-signals by reordering the samples of the original received signal based on the known PN code and Walsh code for the pilot channel. The pseudo-signal(s) and the original signals may then be combined to produce a composite signal having an improved signal-to-noise ratio.

Figure 2A:
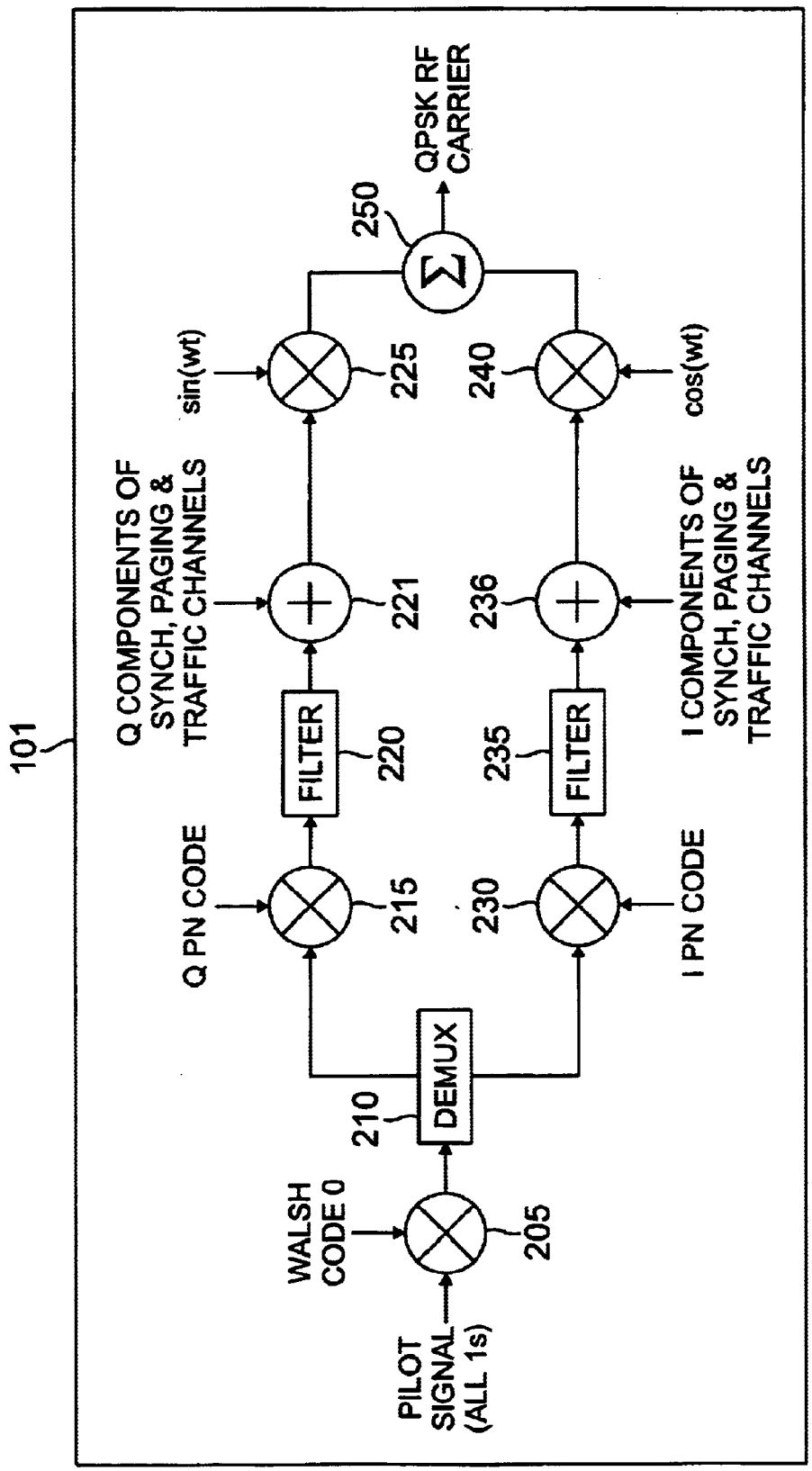
FIG. 2A illustrates selected portions of the transmitter circuitry in a base station according to one embodiment of the present invention.

FIG. 2A illustrates selected portions of the transmitter circuitry in base station 101 according to one embodiment of the present invention. The transmit path comprises mixer 205, which receives a pilot channel signal consisting of a series of Logic 1 values and encodes them with a Walsh code 0 value in mixer 205. The encoded output of mixer 205 is demultiplexed by demultiplexer (DEMUX) 210 into in-phase (I) components and quadrature (Q) components. The quadrature (Q) signal component is the input to quadrature (Q) mixer 215 and the in-phase (I) signal component is the input to in-phase (I) mixer 230.

In one embodiment of PN modulation, quadrature PN mixer 215 spreads the composite baseband signal by combining it with a quadrature (Q) pseudo-random noise (PN) code. The spread output of quadrature mixer 215 is filtered by filter 220. In-phase PN mixer 230 spreads the composite baseband signal by combining it with an in-phase (I) pseudo-random noise (PN) code. The spread output of in-phase mixer 230 is filtered by filter 235. In another embodiment, complex PN modulation of I and Q components occurs in accordance with TIA/EIA-2000.

The output of filter 220 is input to combiner 221, which combines the quadrature (Q) component of the pilot signal with quadrature components (Q) of the synch, paging and traffic channel signals. The output of filter 235 is input to combiner 236, which combines the in-phase (I) component of the pilot signal with in-phase (I) components of the synch, paging and traffic channel signals. The combined, quadrature signal is up-converted to a radio frequency (RF) signal by RF mixer 225 using the carrier reference signal, sin(wt). The combined, in-phase signal is up-converted to a radio frequency (RF) signal by RF mixer 240 using the carrier reference signal, cos(wt). The outputs of RF mixer 225 and RF mixer 240 are combined by combiner 250 to form a QPSK RF carrier output.

In current CDMA systems, each base station transmits a pilot channel continuously on each active forward CDMA channel. The pilot channel is an unmodulated spread spectrum signal used by a mobile station to acquire timing for the Forward traffic channel, provides a phase reference for coherent demodulation, and provides each access terminal or mobile station with a means for signal strength comparisons between base stations for determining when to handoff. For IS-95 or IS-2000, the pilot channel signal is spread with Walsh Code 0, as shown in FIG. 2A. The synch channel broadcasts synchronization messages to mobile stations. For IS-95 or IS-2000, the synch channel signal is spread with Walsh Code 32. One or more paging channels are used to send control information and paging messages from the base station to the mobile stations. Paging channels are spread with Walsh Codes 7–13.

After spreading by Walsh Code 0, the pilot channel is spread in quadrature, as shown in FIG. 2A, by a time-offset pilot PN sequence, which distinctly identifies each pilot channel. According to an exemplary embodiment of the present invention, the spreading sequence has a length $2^{15}$ (i.e., 32768 PN chips) and offset index of 0 through 511, inclusive. The spreading sequences for the I and Q components of the quadrature modulation are based on the following characteristic polynomials for the in-phase (I) and quadrature (Q) sequence:

$$P_I(x) = x^{15} + x^{13} + x^9 + x^8 + x^7 + x^5 + 1 \quad (1)$$

$$P_Q(x) = x^{15} + x^{12} + x^{11} + x^{10} + x^6 + x^5 + x^4 + x^3 + 1 \quad (2)$$

The start of the sequence for the zero offset pilot PN sequence begins every even second in time.

Figure 2B:
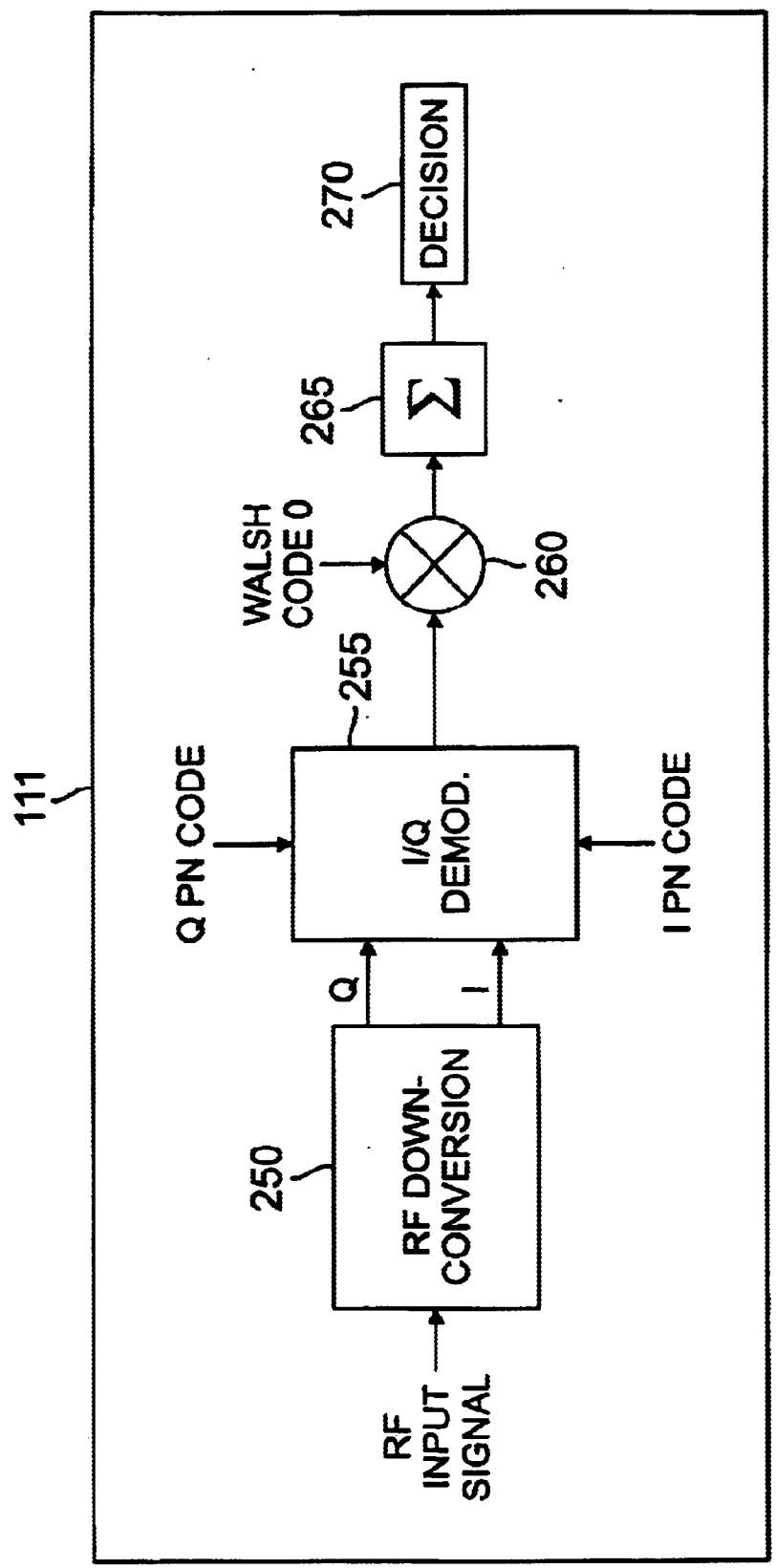
FIG. 2B illustrates selected portions of the receiver circuitry in a mobile station or other access terminal according to one embodiment of the present invention.

FIG. 2B illustrates selected portions of the receiver circuitry in mobile station 111 (or other access terminal) according to one embodiment of the present invention. The receive path comprises RF down-conversion block 250, I/Q demodulation block 255, mixer 260, summation unit 265, and decision block 270. RF down-conversion block 250 mixes the RF input signal from the antenna with a sin(ωt) reference carrier and a cos(ωt) carrier reference to produce an in-phase (I) signal and a quadrature (Q) signal. I/Q demodulation block 255 despreads the I and Q signals to produce the composite baseband signal. Mixer 260 then despreads the composite baseband signal using Walsh code 0 to recover the Pilot Channel, Walsh Code 32 to recover the Synch Channel, or Walsh Codes 7–13 to recover the one or more Paging Channels.

The present invention employs a method for creating and combining replicas (called pseudo-signals) of a received CDMA spread spectrum pilot channel signal in the presence of additive noise plus interference to reduce the required energy per chip (Ec) at the receiver input for reliable pilot channel reception. The combining is performed by summation unit 265 and the combined pseudo-signals are examined by decision block 270. The present invention improves the detection of the unmodulated pilot channel and the determination of the PN sequence synchronization. Once the access terminal achieves pilot PN sequence synchronization, the synchronization for the sync channel, paging channel and traffic channels are known.

Figure 3:
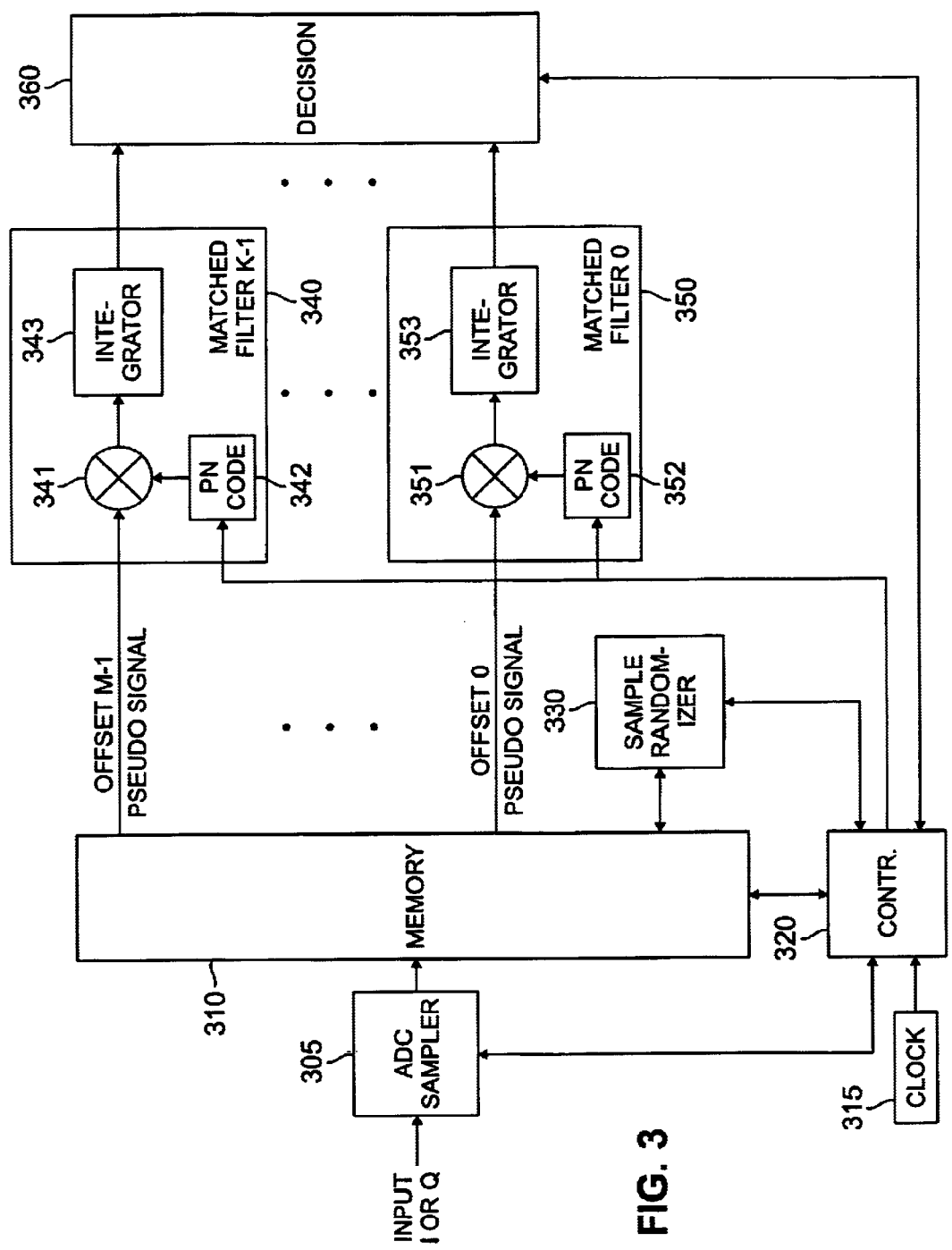
FIG. 3 illustrates in greater detail the selected portions of the receiver circuitry in a mobile station or other access terminal according to one embodiment of the present invention.

FIG. 3 illustrates in greater detail selected portions of the receive path in mobile station 111 (or other access terminal) according to one embodiment of the present invention. The receive path comprises analog-to-digital (ADC) sampler 305, memory 310, reference clock 315, controller 320, sample randomizer 330, decision circuit 360, and K matched filters, including exemplary matched filter 340 (labeled Matched Filter K–1) and exemplary matched filter 350 (labeled Matched Filter 0). Matched filter 340 comprises despreading mixer 341, which receives PN code 342 and Offset M–1 pseudo-signal, and integrator 343. Matched filter 350 comprises despreading mixer 351, which receives PN code 352 and Offset 0 pseudo-signal, and integrator 353.

The circuit in FIG. 3 receives a set of original signal samples captured by ADC sampler 305 for each chip and generates a plurality of time-shifted copies of the original signal samples that are filtered by the matched filters and analyzed by decision circuit 360 to determine if a pilot channel signal has been detected. If the pilot channel signal is not detected, the present invention uses the original signal samples to generate one or more timer-shifted sets of pseudo-signals that are filtered by the matched filters and combined with the original filtered samples. The combined samples are then iteratively examined by decision circuit 360 until the pilot channel signal is detected.

Figure 4A:
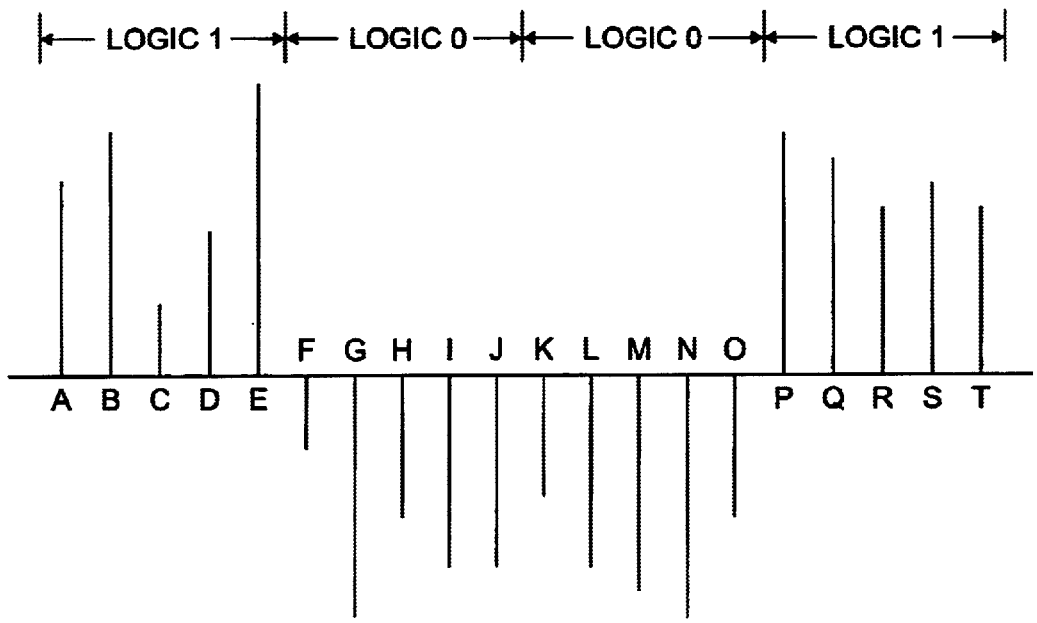
FIG. 4A illustrates an original sampled signal captured by a mobile station or other access terminal.

The theory behind the generation and use of pseudo-signals is explained with reference to FIGS. 4A and 4B. FIG. 4A illustrates an original sampled signal captured by mobile station 111 (or other access terminal) and stored in memory 310. The sampled signal is a digital data stream or digital spread spectrum chip sequence corrupted by additive noise or interference. In one embodiment of the invention, equally spaced samples are taken within each chip by ADC 305 and stored in memory 310. In another embodiment of the invention, randomly spaced samples are taken within each chip by ADC 305 and stored in memory 310. A chip sequence comprising the binary values [1,0,0,1] is being processed. A Logic 1 value corresponds to an amplitude of +A and a Logic 0 value corresponds tn amplitude of –A. The first chip, a Logic 1 level, is sampled and produces the values: Sample A, Sample B, Sample C, Sample D, and Sample E. The second chip, a Logic 0 level, is sampled and produces the values: Sample F, Sample G, Sample H, Sample I, and Sample J. The third chip, a Logic 0 level, is sampled and produces the values: Sample K, Sample L, Sample M, Sample N, and Sample O. The fourth chip, a Logic 1 level, is sampled and produces the values: Sample P, Sample Q, Sample R, Sample S, and Sample T.

Figure 4B:
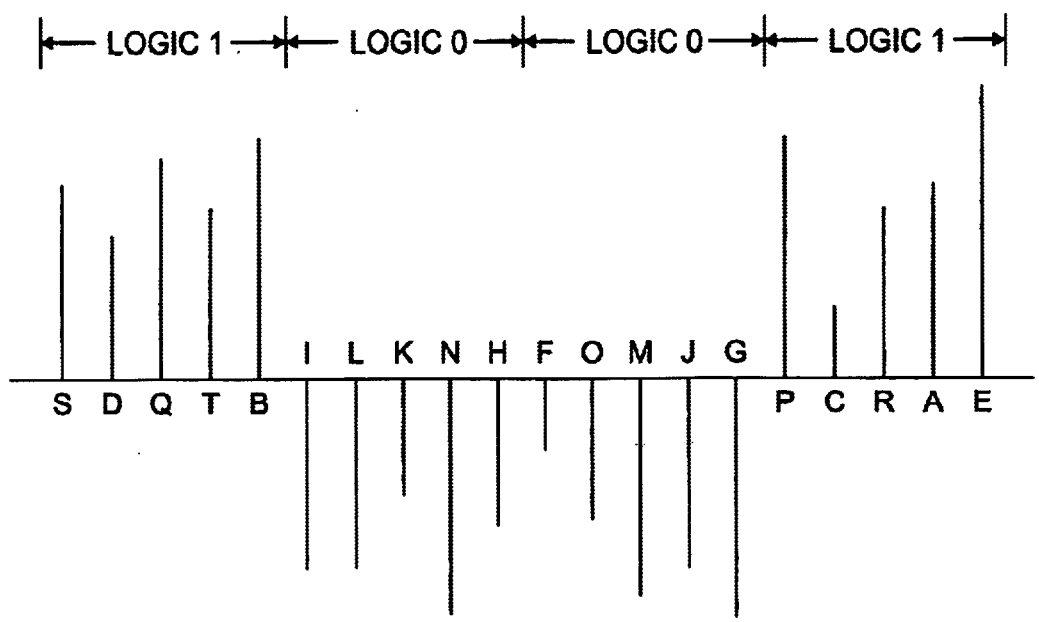
FIG. 4B illustrates a reconstructed pseudo-signal created in a mobile station or other access terminal by reordering the digital samples in the original sampled signal in FIG. 4A.

FIG. 4B illustrates a reconstructed pseudo-signal created in mobile station 111 (or other access terminal) by reordering the digital samples for Logic 1 level in the original signal samples in FIG. 4A and by reordering the digital samples for Logic 0 level in the original signal samples in FIG. 4A. The re-ordering is performed by controller 320, sample randomizer 330, and memory 310. After re-ordering, all samples that were in a Logic 1 chip of the original signal in FIG. 4A remain in a Logic 1 chip of the pseudo-signal in FIG. 4B. Similarly, all samples that were in a Logic 0 chip of the original signal in FIG. 4A remain in a Logic 0 chip of the pseudo-signal in FIG. 4B.

In the pseudo-signal, the first chip, a Logic 1 level, now contains the values: Sample S, Sample D, Sample Q, Sample T, and Sample B. The second chip, a Logic 0 level, now contains Sample I, Sample L, Sample K, Sample N, and Sample H. The third chip, a Logic 0 level, now contains Sample F, Sample O, Sample M, Sample J, and Sample G. The fourth chip, a Logic 1 level, now contains the values: Sample P, Sample C, Sample R, Sample A, and Sample E.

Reordering of the Logic 1 samples and reordering of the Logic 0 samples shifts the random noise signals to different time slots in the chip sequence. The method generates a different sampled, spread spectrum signal with respect to noise signal distribution. The following describes how combination of reconstructed pseudo-samples generated by reordering of samples with the method above lowers the energy-per-chip required for reliable signal detection.

FIG. 3 illustrates a block diagram for one embodiment of the invention for detection of the pilot signal. The circuit computes the correlation of multiple, time-shifted pseudo-signals with the known form of the pilot PN code in an iterative process until a synchronization match is obtained. A set of time-shifted pseudo-signals is required since the phase of the PN sequence is unknown prior to pilot channel acquisition. Upon detection of a match, the access terminal has achieved PN sequence synchronization.

ADC sampler 305 obtains K samples per chip time ($T_c$) of the received pilot channel signal (plus interference) for up to J chip-time intervals and stores the samples in memory 310. In one embodiment of the invention, the number of chip time intervals may equal 32768 PN chips. In another embodiment of the invention, the number of chip time intervals may equal some fraction of the PN sequence length for reduced correlation and processor loading. Controller 320 uses clock 315 to estimate $T_c$ for the pilot channel sequence and to determine the sample times. After collection of the J×K samples, controller 320 creates a set of K time-shifted pseudo-signals from this sampled data.

In one embodiment of this invention, the relative time shift between each successive pseudo samples, is set by $T_c/K$. To create each pseudo-signal, controller 320 first determines the time slots that correspond to a Logic 1 and the time slots that correspond to a Logic 0 in the known modulated PN and Walsh code sequence. Controller 320 designates SLOT_1 as the set of time slots for a Logic 1 and designates SLOT_0 as the set of slots for the Logic 0 of the pilot PN sequence. Controller 320 uses set SIGNAL_1 to identify the set of sampled values obtained for the corresponding Logic 1 time slots and set SIGNAL_0 to identify the set of sampled values obtained for the corresponding Logic 0 time slots. Controller 320 randomly places the sampled values contained in set SIGNAL_1 in the time slots of SLOT_1 of the template and the sampled values in set SIGNAL_0 in the time slots designated in SLOT_0. If the received signal is time-aligned with the expected PN code sequence, then randomly placing the Logic 1 samples within the SIGNAL_1 positions does not change the received modulated PN and Walsh code sequences. Likewise, randomly placing the Logic 0 samples within the SIGNAL_0 positions does not change the received modulated PN and Walsh code sequence in this case.

Controller 320 then creates J additional pseudo signals in this manner and sums the results to obtain a composite pseudo-signal. For the case where the sampled signal is time aligned with the expected PN code, the summation results in coherent combining of the desired Logic 1 and Logic 0 level signal components and non-coherent combining of the undesired noise and interference components. Those skilled in the art should appreciate that non-coherent combining of random signals yields a resultant that approaches zero mean as the number of samples increases.

The invention uses the following method to create 2-to-M additional time-offset pseudo signals. For each of the remaining 2-to-M versions of the pseudo-signals, controller 320 shifts the reference by a $T_c/K$ and redefines the sample time assignments of SIGNAL_1 and SIGNAL_0. Controller 320 then applies the method in the above process to each time-offset pseudo-signals. Upon completion of the creation of the composite pseudo-signal, controller 320 uses the matched filters to despread or demodulate each of the K pseudo-signals by performing a correlation with the known PN code sequence. If none of the integrators in the K matched filters indicates a signal match with the desired code, controller 320 executes a time shift of one or more chips and repeats the process above for generating a new set of composite pseudo-signals. The process repeats until at least one matched filter output indicates a sequence match or until the execution of a set number of cycles.

Signal detection theory shows that the required signal-to-noise ratio of a binary sequence at the input to a detector, expressed in terms of $E_b/N_o$, varies inversely as the number of signal samples M. That is:

$$(E_b/N_o)_M = 1/M(E_b/N_o)_1 \quad (3)$$

where
$E_b$=energy per bit;
$N_o$=noise density;
$(E_b/N_o)_1$=single sample signal-to-noise ratio for the signal;
$(E_b/N_o)_M$=M-sample signal-to-noise ratio for the signal; and
M=number of signal samples.

For direct sequence CDMA binary sequences, it is permissible to replace the energy per bit ($E_b$) with energy per chip ($E_c$) without loss of generality. Those familiar with signal detection methods will recognize that a noisy signal, S(t), may be represented as a combination of a digital information part and a noise (random) part. For a bipolar representation of a binary signal, the signal states are recognized as +A for a Logic 1 and −A for a Logic 0. The value of A is proportional to the square root of $E_c$.

Since noise in communications systems is a stationary random process, the statistics are not affected by a shift of the time origin. The samples for the Logic 1 chips take on the form of a stationary process since the statistics are not affected by a shift of the sample location from one position to another within the Logic 1 envelope. Hence, sampled values of the Logic 1 chips may be placed in any order within the Logic 1 envelope. Likewise, the sampled values for the Logic 0 chips may be positioned in any order within the Logic 0 envelope.

The noise signal is a random gaussian variable with zero mean and variance $(\sigma_n)^2 = N_o B$, where $N_o$ is the noise spectral power density and B is the bandwidth. Summing M pseudo-signals produces the composite results for the Logic 1 and Logic 0 samples. Since the noise samples represent a gaussian variable, the summation over M sampled noise values approaches $S_n$, the digital information signal, for a large number of samples.

The present invention improves the performance of wireless digital communications systems by: (1) reducing the required $E_c/I_o$ at the CDMA receiver to detect the pilot channel; (2) provide the capability of the access terminal to acquire the pilot channel signal at greater distances from the BTS, thereby increasing the coverage area of the BTS; (3) provide the capability to operate the BTS at lower pilot power for reduced RF pollution. These improvements enable the acquisition of a pilot channel by an access terminal at ranges comparable to that with the directed gain on a traffic channel or a paging channel.

The present invention proposes a novel method to generate and use multiple copies of a received signal generated by randomly interspersing the samples in a certain manner and reconstructing the signal. This random interspersing of samples de-correlates the noise of adjacent samples in the original sample sequence. This feature provides the following advantages:

a) Lower base station and mobile power for a given range; or b) Greater base station and mobile range for a given transmit power.

Although the present invention has been described in detail, those skilled in the art should understand that they can make various changes, substitutions and alterations herein without departing from the spirit and scope of the invention in its broadest form.

What is claimed is:

1. A Code Division Multiple Access (CDMA) receiver capable of detecting a pilot channel signal having a known pseudo-random noise (PN) chip sequence, said known PN chip sequence comprising a plurality of known Logic 1 chips and a plurality of known Logic 0 chips, said CDMA receiver comprising:

a memory capable of storing said pilot channel signal as a first original sequence of chip samples;

a pseudo-signal generator capable of re-ordering selected ones of said first original sequence of chip samples to thereby generate a first re-ordered sequence of chip samples, wherein said pseudo-signal generator combines said original sequence of chip samples with said first re-ordered sequence of chip samples to thereby generate a first pseudo-signal sequence of combined chip samples;

a first matched filter capable of computing a first correlation value indicating a relative correlation between said first pseudo-signal sequence of combined chip samples and said known PN chip sequence; and a decision circuit capable of determining from said first correlation value if said pilot channel signal has been detected.

2. The CDMA receiver as set forth in claim 1 wherein said pseudo-signal generator is further capable of re-ordering selected ones of said original sequence of chip samples to thereby generate a second re-ordered sequence of chip samples, wherein said pseudo signal generator combines said first pseudo-signal sequence of combined chip samples with said second re-ordered sequence of chip samples to thereby generate a second pseudo-signal sequence of combined chip samples.

3. The CDMA receiver as set forth in claim 2 wherein said first matched filter computes a second correlation value indicating a relative correlation between said second pseudo-signal sequence of combined chip samples and said known PN chip sequence.

4. The CDMA receiver as set forth in claim 3 wherein said decision circuit determines from said second correlation value if said pilot channel signal has been detected.

5. The CDMA receiver as set forth in claim 1 wherein said pseudo-signal generator generates from said first original sequence of chip samples a first time-shifted original sequence of chip samples and re-orders selected ones of said first time-shifted original sequence of chip samples to thereby generate a first time-shifted re-ordered sequence of chip samples, wherein said pseudo-signal generator combines said first time-shifted original sequence of chip samples with said first time-shifted re-ordered sequence of chip samples to thereby generate a first time-shifted pseudo-signal sequence of combined chip samples.

6. The CDMA receiver as set forth in claim 5 further comprising a second matched filter capable of computing a second correlation value indicating a relative correlation between said first time-shifted pseudo-signal sequence of combined chip samples and said known PN chip sequence.

7. The CDMA receiver as set forth in claim 6 wherein said decision circuit determines from said second correlation value if said pilot channel signal has been detected.

8. The CDMA receiver as set forth in claim 1 wherein said pseudo-signal generator re-orders said selected ones of said first original sequence of chip samples by 1) determining a first plurality of time slots, each of said first plurality of time slots comprising a plurality of chip samples corresponding to Logic 1 chips, and a second plurality of time slots, each of said second plurality of time slots comprising a plurality of chip samples corresponding to Logic 0 chips, and 2) at least one of: a) modifying an order of a first Logic 1 chip sample and a second Logic 1 chip sample; and b) modifying an order of a first Logic 0 chip sample and a second Logic 0 chip sample.

9. The CDMA receiver as set forth in claim 1 wherein said CDMA receiver is disposed in a wireless mobile station comprising one of a cellular telephone, a paging device, a wireless network card, and their equivalents.

10. The CDMA receiver as set forth in claim 1 wherein said CDMA receiver is disposed in a fixed access terminal.

11. A wireless mobile station capable of communicating with a plurality of base stations in a wireless network, said wireless mobile station comprising a Code Division Multiple Access (CDMA) receiver capable of detecting a pilot channel signal having a known pseudo-random noise (PN) chip sequence, said known PN chip sequence comprising a plurality of known Logic 1 chips and a plurality of known Logic 0 chips, said CDMA receiver comprising:

a memory capable of storing said pilot channel signal as a first original sequence of chip samples;

a pseudo-signal generator capable of re-ordering selected ones of said first original sequence of chip samples to thereby generate a first re-ordered sequence of chip samples, wherein said pseudo-signal generator combines said original sequence of chip samples with said first re-ordered sequence of chip samples to thereby generate a first pseudo-signal sequence of combined chip samples;

a first matched filter capable of computing a first correlation value indicating a relative correlation between said first pseudo-signal sequence of combined chip samples and said known PN chip sequence; and a decision circuit capable of determining from said first correlation value if said pilot channel signal has been detected.

12. The wireless mobile station as set forth in claim 11 wherein said pseudo-signal generator is further capable of re-ordering selected ones of said first original sequence of chip samples to thereby generate a second re-ordered sequence of chip samples, wherein said pseudo signal generator combines said first pseudo-signal sequence of combined chip samples with said second re-ordered sequence of chip samples to thereby generate a second pseudo-signal sequence of combined chip samples.

13. The wireless mobile station as set forth in claim 12 wherein said first matched filter computes a second correlation value indicating a relative correlation between said second pseudo-signal sequence of combined chip samples and said known PN chip sequence.

14. The wireless mobile station as set forth in claim 13 wherein said decision circuit determines from said second correlation value if said pilot channel signal has been detected.

15. The wireless mobile station as set forth in claim 11 wherein said pseudo-signal generator generates from said first original sequence of chip samples a first time-shifted original sequence of chip samples and re-orders selected ones of said first time-shifted original sequence of chip samples to thereby generate a first time-shifted re-ordered sequence of chip samples, wherein said pseudo-signal generator combines said first time-shifted original sequence of chip samples with said first time-shifted re-ordered sequence of chip samples to thereby generate a first time-shifted pseudo-signal sequence of combined chip samples.

16. The wireless mobile station as set forth in claim 15 further comprising a second matched filter capable of computing a second correlation value indicating a relative correlation between said first time-shifted pseudo-signal sequence of combined chip samples and said known PN chip sequence.

17. The wireless mobile station as set forth in claim 16 wherein said decision circuit determines from said second correlation value if said pilot channel signal has been detected.

18. The wireless mobile station as set forth in claim 11 wherein said pseudo-signal generator re-orders said selected ones of said first original sequence of chip samples by 1) determining a first plurality of time slots, each of said first plurality of time slots comprising a plurality of chip samples corresponding to Logic 1 chips, and a second plurality of time slots, each of said second plurality of time slots comprising a plurality of chip samples corresponding to Logic 0 chips, and 2) at least one of: a) modifying an order of a first Logic 1 chip sample and a second Logic 1 chip sample; and b) modifying an order of a first Logic 0 chip sample and a second Logic 0 chip sample.

19. The wireless mobile station as set forth in claim 11 wherein said wireless mobile station comprises one of a cellular telephone, a paging device, a wireless network card, and their equivalents.

20. A method of detecting a pilot channel signal having a known pseudo-random noise (PN) chip sequence, the known PN chip sequence comprising a plurality of known Logic 1 chips and a plurality of known Logic 0 chips, the method comprising the steps of:

storing the pilot channel signal as a first original sequence of chip samples;

re-ordering selected ones of the first original sequence of chip samples to thereby generate a first re-ordered sequence of chip samples;

combining the original sequence of chip samples with the first re-ordered sequence of chip samples to thereby generate a first pseudo-signal sequence of combined chip samples;

computing a first correlation value indicating a relative correlation between the first pseudo-signal sequence of combined chip samples and the known PN chip sequence; and determining from the first correlation value if the pilot channel signal has been detected.

* * * * *